May 29, 1928.
B. M. LEECE
1,671,246
COMPENSATED LIGHTING SYSTEM FOR MOTOR VEHICLES
Filed April 19, 1923
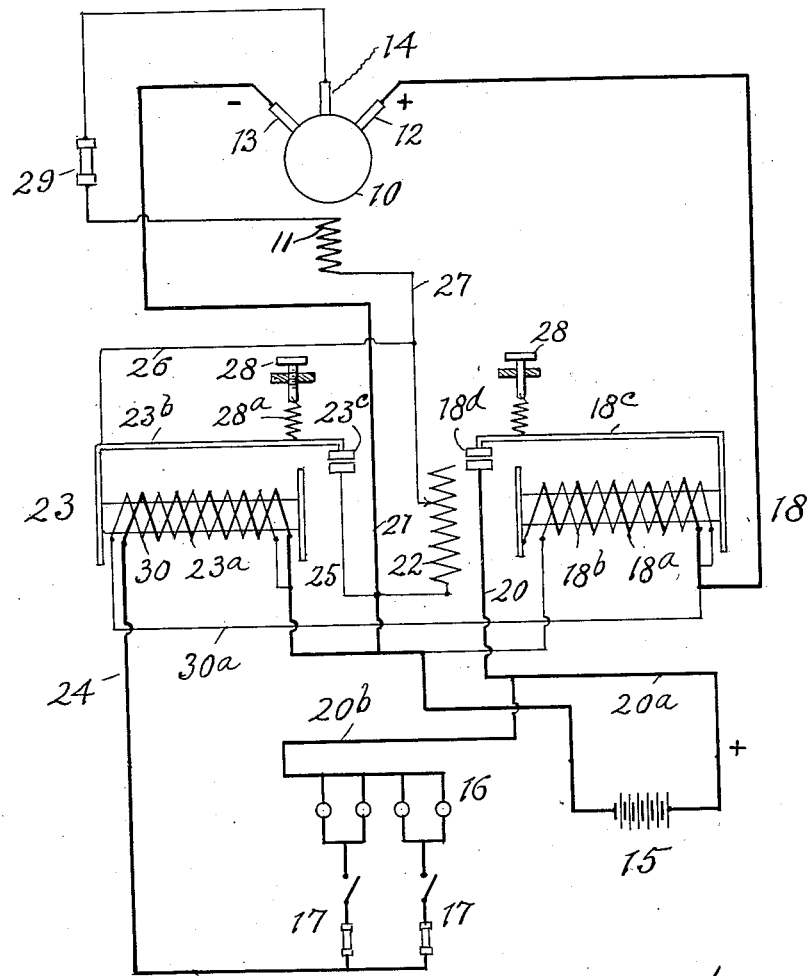

Patented May 29, 1928.

1,671,246

UNITED STATES PATENT OFFICE.

BENNETT M. LEECE, OF CLEVELAND, OHIO, ASSIGNOR TO THE LEECE-NEVILLE COMPANY, OF CLEVELAND, OHIO, A CORPORATION OF OHIO.

COMPENSATED LIGHTING SYSTEM FOR MOTOR VEHICLES.

Application filed April 19, 1923. Serial No. 633,316.

This invention relates to a lighting system for automobiles such as buses wherein there is generally a heavy lighting load including in addition to the usual head lamps a number of lamps for illuminating the interior of the bus.

The principal object of the invention is to provide certain improvements which will permit the use of a smaller battery and in many instances of a smaller generator, will require less power consumption, and will necessitate less frequent filling of the batteries than is the case with ordinary lighting systems.

The above advantages are attained by my invention which involves the use of a so-called compensator which automatically varies the output of the generator as the load circuit is opened and closed, this compensator including a resistance which is in the field circuit of the generator when the load circuit is open or takes a current of less than a certain amount, and also a magnet having a coil in the load circuit, and adapted to cut the resistance into and out of the field circuit.

Various auxiliary features are provided in connection with the above, including suitable provision for preventing the resistance being burned out should the machine be run with the battery disconnected. Other features reside in the provision of means whereby the compensator may be adapted for varying service conditions, as, for example, an adjustment for the magnet which controls the resistance to enable the load point at which the resistance is cut out of the field circuit to be adjusted; also an adjustment for the resistance itself to adapt the generator for use with different size batteries.

The above and other features constitute my invention which may be further briefly summarized as consisting in certain novel combinations and arrangements of parts which will be described in the specification and set forth in the appended claims.

The single figure of the drawing shows diagrammatically a lighting circuit equipped with my invention.

Referring now to the drawings, 10 represents the armature and 11 the field winding of the generator which is preferably an inherently regulated constant current machine of the third brush type. The two main brushes of the machine are designated 12 and 13, the former being the positive brush and the latter the negative, the adjustable auxiliary brush being designated 14. Associated with the generator is a storage battery 15 which is adapted to be charged by the generator and is adapted to supply along with, or independently of the generator, current to the load circuit, and which may also supply current for starting and ignition purposes. The load circuit is designated 16 and is here shown as consisting of lamps of which there may be any number. In this instance the lamps are arranged in two groups controlled by switches 17.

My improved compensator, including the field resistance and the magnet for controlling it, is preferably associated with the usual reverse current cut out and is preferably enclosed with the reverse current cut out in a box or casing adapted to be mounted at any convenient point and to be arranged between the generator and the battery and load. In this instance the reverse current cut out is shown at 18, and as my invention does not reside in this element per se a brief description of the same will suffice. As here shown, the reverse current cut out consists of a magnet having the usual series coil $18^a$, a shunt coil $18^b$, an armature $18^c$, and controlling contacts $18^d$. One end of the series and one end of the shunt coil are here shown connected by a conductor 19 to the positive brush 12, while the other end of the series coil is shown connected to the armature $18^c$. The stationary contact associated with the movable armature is connected to a conductor 20 having a branch $20^a$ leading to the positive terminal of the battery, and a branch $20^b$ leading to the positive side of the load circuit. The shunt coil is also connected to a conductor 21 leading to the negative brush 13 of the generator.

My improved compensator consists of a resistance 22 and a magnet 23. The magnet 23 includes a coil $23^a$ which is in the load circuit when the load switch or switches are closed. In this instance one end of this coil is connected by a conductor 24 leading to the negative side of the load circuit or to the switches 17. The other terminal of the coil $23^a$ is connected to the conductor 21 leading to the negative brush 13. Additionally the magnet 23 includes an armature 23^b and contacts 23^c, the armature and contacts 23^c when closed on the energization of the magnet being adapted to short circuit the resistance 22, the short circuiting path in this instance being established by conductors 25 and 26. This resistance 22 has one terminal connected to the conductor 21 leading to the negative brush 13, and its other terminal is connected by a conductor 27 leading to the field winding 11.

Thus it will be seen that the circuit is completed from the positive terminal of the generator through the series coil, armature and contacts of the reverse current cut out to the positive side of the battery and to the positive side of the load circuit, the negative terminal of the battery and the negative side of the load circuit being both connected to the conductor 21 leading to the negative terminal of the battery. Likewise it will be observed that when the contacts of the compensator magnet are open, as when the load circuit is open, either partially or wholly, as will be explained, the resistance 22 is in the generator field circuit, the field circuit being as follows: from the auxiliary brush 14 which in this case is a positive brush, through the field winding, through the resistance 22 to the conductor 21 and to the negative brush 13, but when the compensator magnet is energized and the contacts 23^c closed, the resistance 22 is then short circuited by the contacts and armature of the magnet. This occurs when the load circuit or a certain part thereof is closed, causing the output of the generator to be increased over the output which existed when the load circuit is open and the generator is supplying current to the battery only.

Generally the magnet is provided with a suitable adjustment to vary the load point at which the resistance is cut into or out of the field circuit. This adjustment is usually provided by means of an adjusting screw 28 connected to a spring 28^a which in turn is connected to the armature 23^b of the compensator magnet. The magnet will be so adjusted that when the load in the exterior load circuit exceeds the normally low charging rate of the generator, the magnet will be energized to a point such as to cut the resistance out of the field circuit. This in some instances will permit the flow of some current through a part of the load such, for example, through part of the lamps, as the head lamps, without cutting out the field resistance.

Thus it will be seen that when the load circuit is open and the resistance is in the field circuit, the output of the generator is such that current will be supplied to the battery at the desired low rate which thus permits the use of a battery of relatively small ampere hour capacity, but when the load is thrown onto the circuit so as to require greater output, the closing of the load circuit or that part thereof which causes a predetermined amount of current to go through the series coil of the compensator magnet causes the field resistance 22 to be short circuited or cut out of the field circuit. It will be seen, therefore, that the generator normally has no greater output than is required to supply current to a relatively small battery, and that the power required to drive the generator at a high charging rate is saved, but, nevertheless, when the load is thrown onto the generator the field excitation is increased by cutting out the field resistance so that the generator will have the necessary output to meet the increased load demand.

The amount of resistance in the field circuit will usually depend upon the size of the battery, and to adapt the machine for different size batteries, the resistance is preferably made adjustable. This adjustability may be obtained by arranging the resistance so that it can be replaced by one of higher or lower ohmic value, or by a sliding contact which cuts in or out part of the turns of the resistance as illustrated in the drawing. When the compenstor is used with a battery of higher ampere hour capacity the resistance will be adjusted so as to decrease to the right point its ohmic value, and if used with a battery of lower ampere hour capacity the amount or value of the resistance is increased so that the battery will be charged at the desired rate.

It will be understood also that the third brush 14 of the generator may be adjusted whenever it is desired to vary the output of the machine.

A compensator having a single coil connected and functioning as explained, has proven to be satisfactory in operation and to produce the desired results if conditions are normal. However, it is sometimes the case that the machine is driven with the battery disconnected accidentally or otherwise, and when this occurs with the load circuit open, no means will be provided for cutting out the resistance in the field circuit, and it might be destroyed. There is usually provided in the field circuit a fuse such as shown at 29, but this fuse is of necessity for the protection of the field winding and is usually selected to blow when the current in the field circuit reaches a predetermined amount with the resistance cut out of the circuit, it being understood that if the generator is driven on open circuit the voltage, and hence the current in the field circuit, builds up very rapidly. To protect the resistance in the event the generator is driven with the battery disconnected, I may provide in connection with the usual series coil of the compensator magnet, suitable means for cutting the resistance out of the field circuit when there is a predetermined current flowing in the field circuit, or a predetermined voltage across its terminals, and when the series coil of the compensator magnet is incapable of functioning so as to produce this result. This protecting of the resistance can be done in various ways, but in this instance I provide on the core of the compensator magnet a second coil 30, which in this instance is a shunt coil, one end of which is as here shown connected to one end of the series coil 23ª and the other end of which is connected by a conductor 30ª to a suitable point in the positive side of the generator. This coil is so designed that when the voltage in the field circuit builds up to a high predetermined value such as occurs when a machine is driven with the battery disconnected, and such as would or might burn out the resistance 22, it energizes the magnet sufficiently to close the contacts 23°, and thus short circuit the resistance 22 independently of the series coil 23ª which ordinarily functions to accomplish this result.

I do not desire to be confined to the precise details and arrangements shown, but aim in my claims to cover all modifications which do not involve a departure from the spirit and scope of my invention in its broadest aspects.

Having described my invention, I claim:

1. In a lighting system for motor vehicles, a variable speed generator, a battery and a load circuit adapted to be connected to the generator and battery, a resistance connected to the field circuit of the generator, means responsive to a flow of predetermined current in the load circuit for controlling said resistance, and means for cutting the resistance out of the field circuit if the generator is run on open circuit.

2. In a lighting system for motor vehicles, a generator, a battery and a load circuit adapted to be connected to the generator and battery, a resistance normally in the field circuit and adapted to be cut into and out of the same to vary the output of the generator, a magnet having a coil connected to the load circuit for cutting the resistance out of the field circuit when the load current exceeds a predetermined amount, and means separate from said coil for cutting the resistance out of the field circuit if the generator is operated with the battery disconnected.

3. In a lighting system for motor vehicles, a generator, a battery and load circuit adapted to be connected to the generator and battery, a resistance normally in the field circuit and adapted to be cut into and out of the same to vary the output of the generator, a magnet having a coil connected to the load circuit for cutting the resistance out of the field circuit when the load current exceeds a predetermined amount, and said magnet having a separate coil adapted to cause a sufficient magnet energization to cut the resitsance out of the circuit if the generator is driven with the battery disconnected.

In testimony whereof, I hereunto affix my signature.

BENNETT M. LEECE.